United States Patent [19]

Hsiung

[11] Patent Number: 4,887,111

[45] Date of Patent: Dec. 12, 1989

[54] ADJUSTABLE FILM CARTRIDGE

[76] Inventor: Charles J. Hsiung, 500 S. Atlantic Blvd., Monterey Park, Calif. 91754

[21] Appl. No.: 247,621

[22] Filed: Sep. 22, 1988

[51] Int. Cl.4 .............................................. G03B 17/26
[52] U.S. Cl. .................................................... 354/275
[58] Field of Search .............................. 354/210, 275

[56] References Cited

U.S. PATENT DOCUMENTS

| | | | |
|---|---|---|---|
| 3,138,084 | 6/1964 | Harvey | 354/275 X |
| 3,460,449 | 8/1969 | Eagle | 354/275 X |
| 4,160,605 | 7/1979 | Neubaum | 354/275 X |
| 4,247,183 | 1/1981 | Thompson | 354/275 X |

Primary Examiner—Michael L. Gellner

[57] ABSTRACT

Improved film cartridges comprising a film supply housing and a film storage housing, and means adjustably connecting said housings to accommodate a variety of film sizes and which are connected by adjustable spacing means that are selectably positionable to a plurality of positions to permit several previously unimagined uses of 35 millimeter film.

22 Claims, 4 Drawing Sheets 4,887,111

ADJUSTABLE FILM CARTRIDGE

BACKGROUND

1. Field of Invention

This invention relates to photographic film and is particularly directed to an improved cartridge for facilitating the loading and handling of photographic film and for increasing the flexibility and versatility of cameras using film cartridges.

2. Prior Art

It has long been known, in the photographic field, that packaging film in cartridges has numerous advantages over conventional reels or cassette-packaged film. Both reels and cassette-packaged film require that the leading end of the film be properly connected to the film advance mechanism. This is often a difficult procedure or one wherein the film can easily become unseated after positioning, with the result that many photographic opportunities are lost and frequently an entire film is wasted. With cartridge film, the film is loaded by simply dropping the cartridge into the camera. The cartridge cannot be loaded improperly, so that the foregoing problems are overcome. Furthermore, photographers often desire to change films, for example, to permit taking color and black-and-white pictures of a given subject. With reel or cassette-packaged film, such film changes are difficult or impossible to accomplish and require the use of separate cameras for each type of film or risk possible loss of an entire film in trying to make such a substitution. In contrast, film cartridges can readily be removed and replaced at any time, with a maximum loss of only one frame. Thus, the cartridge-packaged film provides greater versatility and flexibility for the photographer.

In spite of these advantages, cartridge-packaged film has never gained acceptance with professional and advanced amateur photographers. One reason for this lack of acceptance has been the fact that these photographers usually prefer 35 millimeter film because of the uniformly high quality of such film and because this size film provides a relatively large exposure area with a camera which is relatively small and convenient to transport and use. Originally, however, 35 millimeter film was developed for movie cameras. As a result, the edges of the film are generally perforated to accommodate the sprockets of movie cameras and projectors and many of the manufacturers of 35 millimeter cameras have designed film advancing mechanisms which utilize these perforations.

Obviously, the space occupied by these perforations substantially reduces the area of the film which is available for photographic exposure. However, because the useful area of the film is superior to that of other available film and because the manufacturers have produced an ever increasing range of cameras and lenses designed for 35 millimeter film, the photographers have accepted the perforations as a necessary compromise. Originally, use of 35 millimeter cameras required a high level of skill and knowledge of the interrelation of film speeds, shutter speeds, aperture settings, light levels, etc. Consequently, only professional or serious amateur photographers attempted to use these cameras.

Recently, the introduction of electronics and miniaturization into camera design and manufacture has greatly reduced the level of skill required to use 35 millimeter cameras and many so-called "point-and-shoot" cameras are available using 35 millimeter film. Unfortunately, these cameras still use reel or cassette film which presents the loading and advancing problems discussed above. Currently, much research is being devoted to attempts to mechanize film loading and advancement mechanisms. However, no satisfactory solution has been developed so far and the complexity of the automatic film loading and advancing mechanisms have significantly increased the complexity of these cameras and the cost of producing and maintaining them.

Numerous attempts have been made, heretofore, to develop cassettes for 35 millimeter film to overcome these problems of film loading and advancing. Unfortunately, none of the prior art devices have been entirely satisfactory or have provided sufficient advantages to persuade manufacturers to adopt the cassettes or to persuade photographers to demand them. Most of the prior art film cassettes have been capable of use only with a specific camera which was designed to use that particular cassette and the advantages offered by the prior art cassettes have not been sufficient to persuade other camera manufacturers to adapt to them or to persuade serious photographers to demand them. A search in the United States Patent Office has revealed the following patents:

| U.S. Pat. No. | INVENTOR | ISSUED |
| --- | --- | --- |
| 3,347,142 | K. Steisslinger | Oct. 17. 1967 |
| 3,426,666 | S. Nagata | Feb. 11, 1969 |
| 3,528,356 | J. Eagle | Sep. 15, 1970 |
| 3,593,635 | H. Servetnick | July 20, 1971 |

The patents to Nagata and Eagle each disclose film cartridges which are for use only with specific cameras which are also disclosed in these patents. The patents to Steisslinger and Servetnick relate only to film cartridges. All of these references seek to overcome the film loading problems discussed above. However, none of these patents provides any additional incentive for manufacturers to adapt their cameras to use film cartridges, nor do they provide any additional incentive for photographers to demand their use. Thus, none of the prior film cartridges has been entirely satisfactory.

BRIEF SUMMARY AND OBJECTS OF INVENTION

The disadvantages of the prior art are overcome with the present invention and a novel film cartridge is proposed which provides the ease of film loading and handling which has characterized prior art film cartridges and which is capable of use with a substantial range of film sizes and lengths and which provides additional versatility and flexibility of use for 35 millimeter film which have been unobtainable heretofore with any type of film packaging. In addition, the film cartridge of the present invention is capable of use with a wide variety of cameras.

The advantages of the present invention are preferably attained by providing a film cartridge having a film supply housing and a film storage housing which are adjustable to accommodate a variety of film sizes and lengths and which are connected by bridge means that are selectably positionable to a plurality of positions to permit several previously unimagined uses of 35 millimeter film.

Accordingly, it is an object of the present invention to provide improved cartridges for photographic film.

Another object of the present invention is to provide improved cartridges for photographic film which cartridges are capable of use with a wide variety of cameras.

An additional object of the present invention is to provide improved film cartridges for photographic film which can accommodate a wide variety of film sizes.

A further object of the present invention is to provide improved film cartridges for photographic film which permit several previously unimagined uses of 35 millimeter film.

A specific object of the present invention is to provide improved film cartridges comprising a film supply housing and a film storage housing which are adjustable to accommodate a variety of film sizes and which are connected by bridge means that are selectably positionable to a plurality of positions to permit several previously unimagined uses of 35 millimeter film.

These and other objects and features of the present invention will be apparent from the following detailed description, taken with reference to the figures of the accompanying drawings.

DETAILED DESCRIPTION OF THE INVENTION

Figure 1:
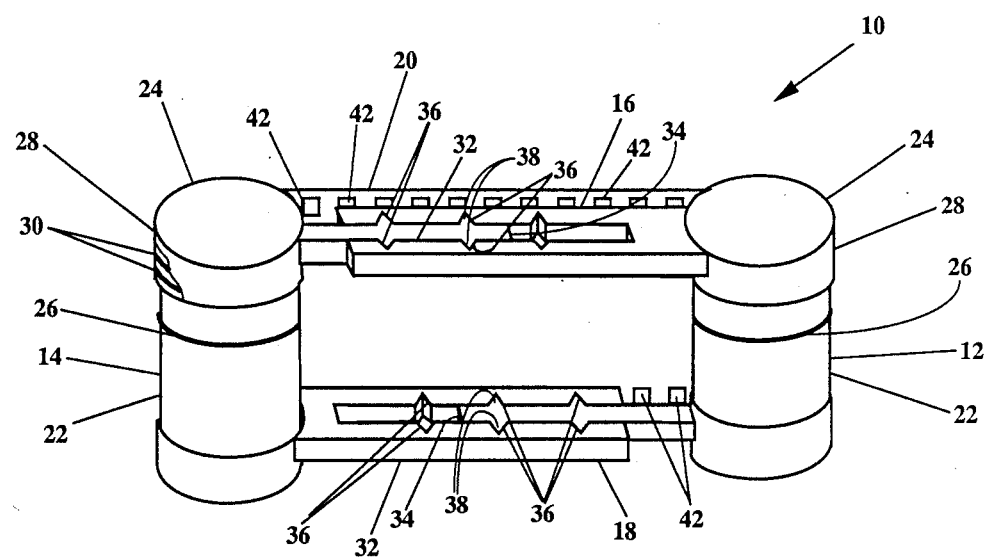
FIG. 1 is an isometric view of a film cartridge embodying the present invention.

In that form of the present invention chosen for purposes of illustration in the drawing, FIG. 1 shows a film cartridge, indicated generally at 10, comprising a supply housing 12 and a storage housing 14 connected by bridge means 16 and 18 with a film 20 shown extending between the supply housing 12 and the storage housing 14 in the conventional manner.

The supply housing 12 and storage housing 14 are substantially identical and each comprise a generally cylindrical hollow canister 22 having a removable cap 24. One or more ribs 26 project outwardly from the canister 22 at several locations spaced vertically at preselected locations along the canister 22, while the cap 24 has a downwardly projecting rim 28 formed with a pair of adjacent inwardly projecting ribs 30. When the cap 24 is placed on the canister 22, the rim 28 will telescope over the canister 22 causing the ribs 30 on the interior of the rim 28 to engage the ribs 26 on the exterior of the canister 22 to releasably retain the cap 24 in a desired position of vertical adjustment with respect to the canister 22. Firm manual pressure will be sufficient to disengage the cap ribs 30 from the canister rib 26 to permit removal of the cap 24 or readjustment of the vertical positioning of the cap 24 with respect to the canister 22. Thus, the supply housing 12 and storage housing 14 can easily be adjusted to accommodate a plurality of different sizes of film.

As noted above, the supply housing 12 and storage housing 14 are connected by bridge means 16 and 18. The bridge means 16 comprises a pair of laterally spaced outer members 32 projecting from the supply housing 12 and a central member 34 projecting from the supply housing 14 and extending between the outer members 32. The outer members 32 are formed with a plurality of recesses 36, while the central member 34 is formed with a pair of lateral flanges 38 which are selectably engageable with a desired pair of the recesses 36 in the outer members 32 to releasably retain a desired spacing between the supply housing 12 and the storage housing 14. Manual pressure applied to the supply housing 12 and storage housing 14 can serve to reposition the flanges 38 of the central member 34 to engage a desired pair of the recesses 36 of the outer members 32 to adjust the width of the film cartridge 10 as desired. Similarly, the bridge means 18 comprises a pair of laterally spaced outer members 32 projecting from the storage housing 14 and a central member 34 projecting from the supply housing 12 and extending between the outer members 32. The outer members 32 are formed with a plurality of recesses 36, while the central member 34 is formed with a pair of lateral flanges 38 which are selectably engageable with a desired pair of the recesses 36 in the outer members 32 to releasably retain a desired spacing between the supply housing 12 and the storage housing 14. Manual pressure applied to the supply housing 12 and storage housing 14 can serve to reposition the flanges 38 of the central member 34 to engage a desired pair of the recesses 36 of the outer members 32 to adjust the width of the film cartridge 10 as desired.

Figure 2:
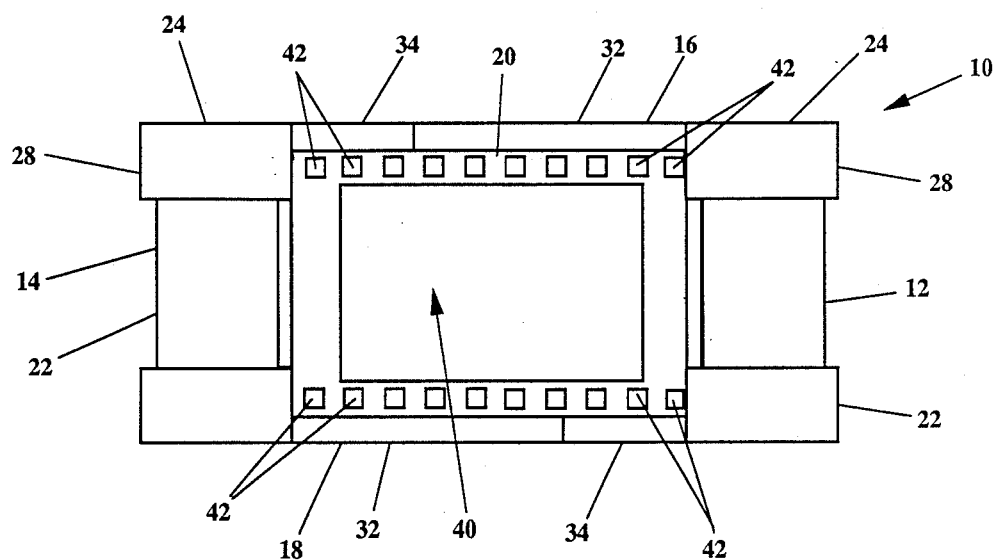
FIG. 2 is a front view of the film cartridge of FIG. 1 with the adjustable spacing means set for horizontal imaging.
Figure 3:
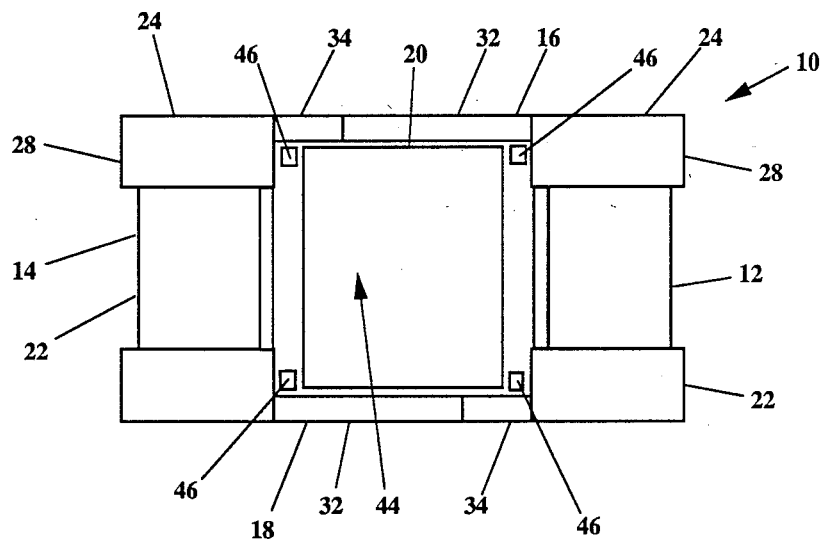
FIG. 3 is a view, similar to that of FIG. 2, showing the film cartridge of FIG. 1 with the adjustable spacing means set for vertical imaging.

As is well known, the traditional image area of 35 millimeter film is 24×35 millimeters with the long axis oriented horizontally, as seen at 40 in FIG. 2. By causing the flanges 38 of the central members 34 to engage the recesses 36 at the midpoint of the outer members 32, the bridge means 16 and 18 can be positioned to adjust the film cartridge 10 to provide this image area, as seen in FIG. 2. However, as noted above, 35 millimeter film was originally developed for the movie industry and, conventionally, is provided with rows of perforations along each edge, as seen at 42 is FIGS. 1 and 2. As noted above, some camera manufacturers have designed their film advancement mechanisms to employ these perforations 42 for loading and advancing the film. However, if the perforations are eliminated and the image area is positioned with its long axis oriented vertically, as seen at 44 is FIG. 3, the number of exposures per roll of film could be increased by 60 percent. Thus, a roll of film which will accommodate 24 exposures, using the horizontal image orientation, could provide 38 exposures using the vertical image orientation. Similarly, a roll of film which will accommodate 36 exposures, using the horizontal orientation, could provide 57 exposures using the vertical image orientation. This increase in film economy should be sufficient to cause professional photographers and serious amateurs to urge adoption of the vertical image format. With the film cartridge 10 of the present invention, the bridge means 16 and 18 can adapt to accommodate this vertical imaging orientation by causing the flanges 38 of the central member 34 of the bridge means 16 and 18 to engage the recesses 36 adjacent the left end of the outer members 32 of the bridge means 16 and 18. If desired, the film 20 could be provided with perforations between the image areas, as seen at 46 in FIG. 3, to cooperate with film advancing sprockets in the camera. Alternatively, windows could be provided in the supply housing 14 and associated cap 24, as seen at 48 and 50 in FIG. 3, to cooperate with cameras employing friction film advance mechanisms.

Figure 4:
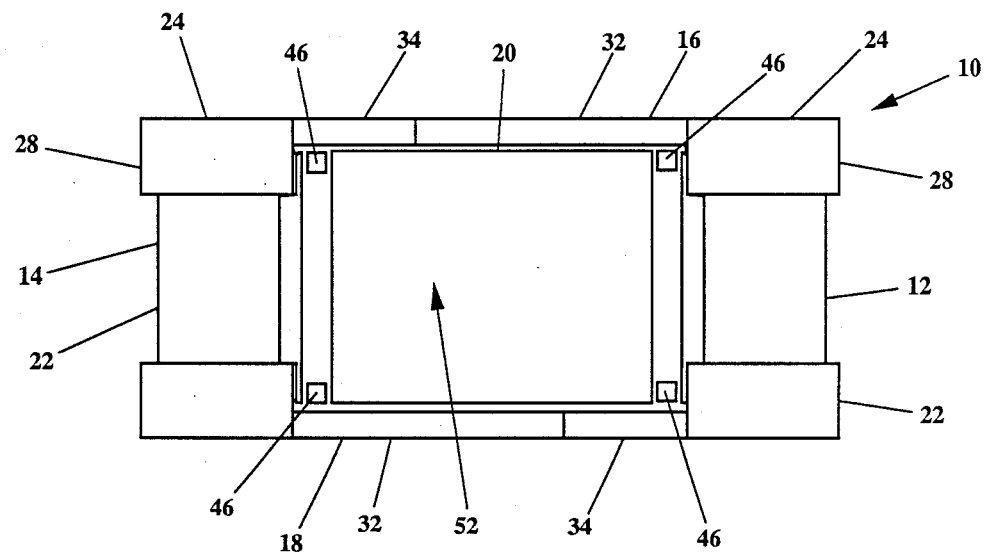
FIG. 4 is a view, similar to that of FIG. 2, showing the film cartridge of FIG. 1 with the adjustable spacing means set for maximum imaging area.

As a further alternative use of the film cartridge 10, the bridge means 16 and 18 could be adjusted to cause the flanges 38 of the central members 34 to engage the recesses 36 adjacent the right end of the outer members 32, as seen in FIG. 4, and using 35 millimeter film having no perforations along the edges thereof. With this arrangement, using the conventional horizontal image orientation, the image area could be increased form the standard 24×35 millimeters to provide an image area of 35×52.5 millimeters. This format has never before been proposed, yet would provide photograph quality which has never been possible heretofore.

As an additional alternative, the perforated portions of 35 millimeter film could be trimmed way, leaving a 26 millimeter film. If the housings 12 and 14 are shortened to fit this size and the bridgess 16 and 18 are made to separate the housings 12 and 14 by the same amount as shown in FIG. 2, another previously unimagined film format is obtained yielding the same film quality and image area as conventional 35 millimeter film, yet permitting cameras to be made substantially smaller and lighter, while being able to use the wide variety of lenses heretofore designed for 35 millimeter cameras. These 26 millimeter cameras would be easier for photographers to carry and more convenient to use than 35 millimeter cameras and could be considerably cheaper.

Figure 5:
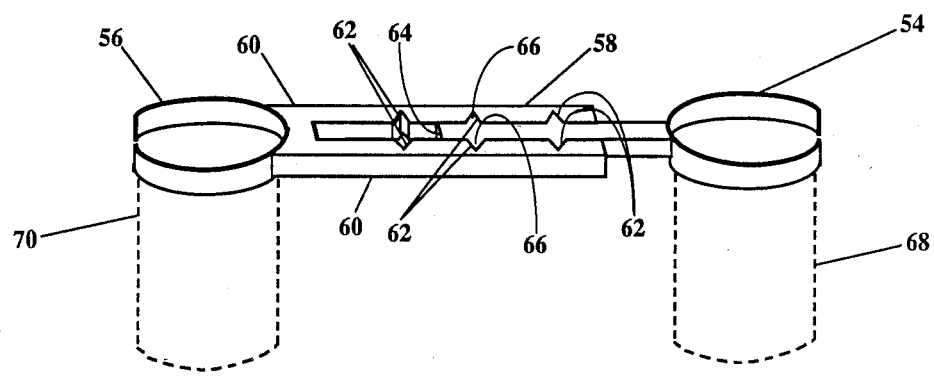
FIG. 5 is an isometric view of a modified form of the film cartridge of FIG. 1.
Figure 6:
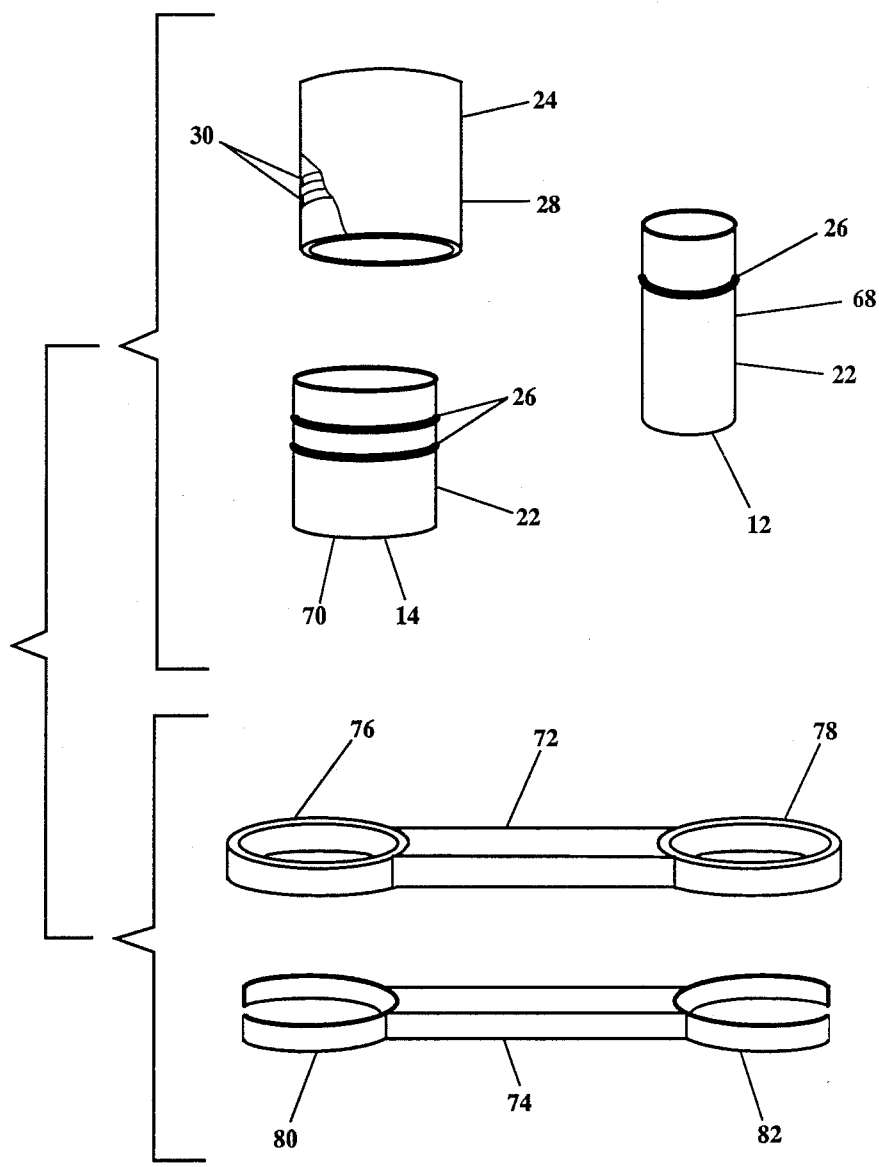
FIG. 6 is a diagrammatic representation showing an additional modified form of the film cartridge of FIG. 1.

FIGS. 5 and 6 show alternative forms of the bridge members 16 and 18 of the film cartridge 10 of the present invention. In FIG. 5, a pair of annular split bands 54 and 56 are provided which are connected by adjustable spacing means 58 comprising outer members 60 formed with spaced pairs of recesses 62 and a central member 64 having flanges 66 projecting outwardly to releasably engage the recesses 62 of the outer members 60 to maintain a desired spacing between the bands 54 and 56. Each of the bands 54 and 56 is sized to frictionally retain a conventional film cassette, as seen at 68 and 70 in FIG. 6, corresponding to the film supply housing 12 and film storage housing 14 of the film cartridge 10 of FIG. 1. Moreover, since the bands 54 and 56 are split, they are readily adaptable to accommodate film cassettes of a variety of diameters or film lengths. By providing two of the bridge units 58 of FIG. 5 and connecting each one to the respective ends of a pair of film cassettes, such as those indicated at 68 and 70 in FIG. 6, the film cassettes 69 and 70 can be adapted to form a film cartridge, similar to the film cartridge 10 of FIG. 1. As shown, the outer members 60 are mounted on the band 56 and the central member 64 is mounted on the band 54. However, it will be apparent that the mounting of the outer members 60 and central member 64 could be reversed, if desired, without significantly altering the functioning of the adjustable spacing means 58.

As seen in FIG. 6, bridge members 72 and 74 are provided which are each of a respective fixed length but are interchangable to form film cartridges, similar to film cartridge 10 of FIG. 1, wherein the housings 12 and 14 are spaced by the length of whichever bridge member 72 or 74 is employed. As shown, bridge member 72 carries annular bands 76 and 78 at its respective ends, which are dimensioned to frictionally retain housings 12 and 14 of a given diameter or film length. It will be apparent that a plurality of pairs of bridge members 72 could be provided, each of a respective length and having bands 76 and 78 of respective diameters to form a variety of film cartridges of substantially and desired size, spacing and housing diameter. Alternatively, split bands could be provided, as seen at 80 and 82 on bridge member 74, to accomodate a range of housing diameters. It will also be apparent that the array of components seen in FIG. 6 permits assembly of a wide variety of film cartridges for many purposes. Furthermore, these film cartridges can be disassembled, without breaking, to recover the film for developing and the components can be reassembled and reloaded with new film as desired. Such reuse greatly reduces the cost of the cartridges. An additional advantage of the film cartridge of the present invention is that it permits removal and replacement of a partially exposed film in full daylight, to permit a portion of the film to be removed for processing without exposing the entire remaining portion of the film. To accomplish this, the user advances the portion of the film to be removed into the storage housing 14, opens the camera and removes the cartridge 10. One frame of the film, which extends across the bridge means 16 and 18 will be exposed. However, the portions of the film contained within the housings 12 and 14 will be protected from the light. The film can then be cut and the storage housing 14, containing the exposed film, can be removed and replaced by a new storage housing 14 to reassemble the cartridge 10. The unexposed remainder of the film is contained in the supply housing 12 with a portion of the frame which was across the bridge means 16 and 18 prior to cutting projecting out of the storage housing 12 to serve as a leader for respooling. This portion of the film can be spooled into the new storage housing 14 and the cartridge 10 can be returned to the camera, after which the remainder of the film can be used in the usual manner. With this procedure, the film can be removed whenever desired with a loss of only one or, at most, two frames. This flexibility of use has been unattainable with any of the prior art film containers and is made possible only be the interchangable film cartridge components of the present invention.

Obviously, numerous other variations and modifications could be made without departing from the spirit of the present invention. Therefore, it should be clearly understood that the forms of the present invention described above and shown in the figures of the accompanying drawing are illustrative only and are not intended to limit the scope of the present invention.

I claim:
1. A film cartridge comprising:
   a film supply housing;
   a film storage housing; and
   at least one bridge means detachably connecting the said housings and serving to maintain a desired spacing between said housings.
2. The film cartridge of claim 1 wherein bridge means comprises:
   a pair of outer members mounted on one of said housings and projecting toward the other of said housings and having a plurality of pairs of recesses formed along the facing surfaces of said outer members, and
   a central member mounted on said other of said housings and projecting toward said one of said housings between said outer members and having a pair of flanges formed on the opposite sides of said central member releasably engageable with said recesses of said outer members to maintain said housings in desired spaced relation.

3. The film cartridge of claim 1 wherein each of said housings comprises:
a generally cylindrical hollow canister having an open upper end, and
a cap frictionally retainable to close said upper end of said canister.

4. The film cartridge of claim 3 further comprising:
means on each of said housings for adjusting the vertical length of said housing.

5. The film cartridge of claim 4 wherein said vertical adjusting means comprises:
a plurality of ribs spaced vertically along said canister and each of said ribs extending laterally about the exterior of said canister and projecting outwardly from the surface of said canister, and
said cap having a downwardly extending rim releasably encircling said canister formed with a pair of adjacent ribs extending laterally about the interior of said rim and projecting inwardly from said rim to cooperate with said ribs on said canister to releasably maintain said cap in a desired vertical position with respect to said canister.

6. The film cartridge of claim 1 wherein said bridge means comprises:
a pair of annular bands frictionally each engagable with a respective one of said housings;
a pair of outer members mounted on one of said bands and projecting toward the other of said bands and having a plurality of pairs of recesses formed along the facing surfaces of said outer members, and
a central member mounted on said other of said bands and projecting toward said one of said bands between said outer members and having a pair of flanges formed on the opposite sides of said central member releasably engageable with said recesses of said outer members to maintain said housings in desired spaced relation.

7. The film cartridge of claim 6 wherein:
said bands are split to frictionally retain housings of a plurality of diameters.

8. The film cartridge of claim 1 wherein:
said bridge means is positioned to maintain said housings spaced to provide an image area on said film of 24×36 millimeters with the long axis thereof oriented horizontally.

9. The film cartridge of claim 1 wherein:
said bridge means is positioned to maintain said housings spaced to provide an image area on said film of 24×36 millimeters with the ling axis thereof oriented vertically.

10. The film cartridge of claim 9 wherein:
said film has no perforations along the edges thereof.

11. The film cartridge of claim 9 wherein:
said film has perforations only between said image areas.

12. The film cartridge of claim 1 wherein:
said bridge means is positioned to maintain said housings spaced to provide an image area on said film of 24×52.5 millimeters with the long axis thereof oriented horizontally.

13. The film cartridge of claim 12 wherein:
said film has no perforations along the edges thereof.

14. The film cartridge of claim 12 wherein:
said film has perforations only between said image areas.

15. The film cartridge of claim 1 wherein:
said bridge means comprises a central portion of fixed length having annular bands mounted at each end of said central portion to frictionally retain said housings.

16. The film cartridge of claim 15 wherein: range of housing diameters.

17. The film cartridge of claim 1 further comprising:
said bridge means being spaced to provide an image area of 24×36 millimeters with the long axis thereof oriented horizontally.

18. The film cartridge of claim 1 further comprising:
said housings being provided in a plurality of combinations of sizes and diameters,
said bridge means being provided in a plurality of lengths,
said housings and said bridge means being selectably assemblable to produce a desired film cartridge.

19. The film cartridge of claim 18 further comprising:
said bridge means each having means located at each end thereof to frictionally retain respective ones of said housings.

20. A film cartridge comprising:
a film supply housing;
a film storage housing; and
at least one bridge means connecting said housings and having means for selectably varying the length of said bridge to establish a desired spacing between said housings.

21. A film cartridge comprising:
a film supply housing;
a film storage housing; and
at least one bridge means connecting said housings, said bridge means comprising a central portion of fixed length having means for releasably securing said bridge to at least one of said housings.

22. The film cartridge of claim 21 further comprising:
said housings being provided in a plurality of combinations of sizes and diameters,
said bridge means being provided in a plurality of lengths,
said housings and said bridge means being selectably assemblable to produce a desired film cartridge.

* * * * *